(No Model.) 3 Sheets—Sheet 1.
C. E. SCRIBNER.
REGULATOR FOR DYNAMO ELECTRIC MACHINES.
No. 435,525. Patented Sept. 2, 1890.
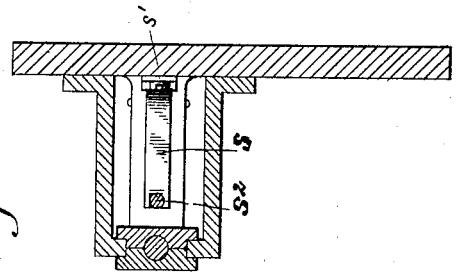
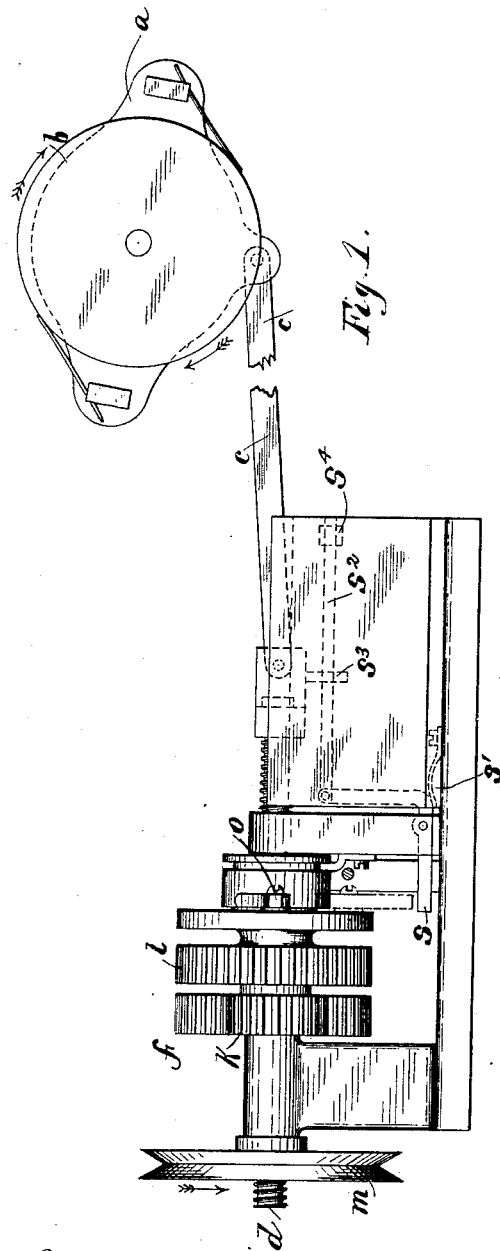
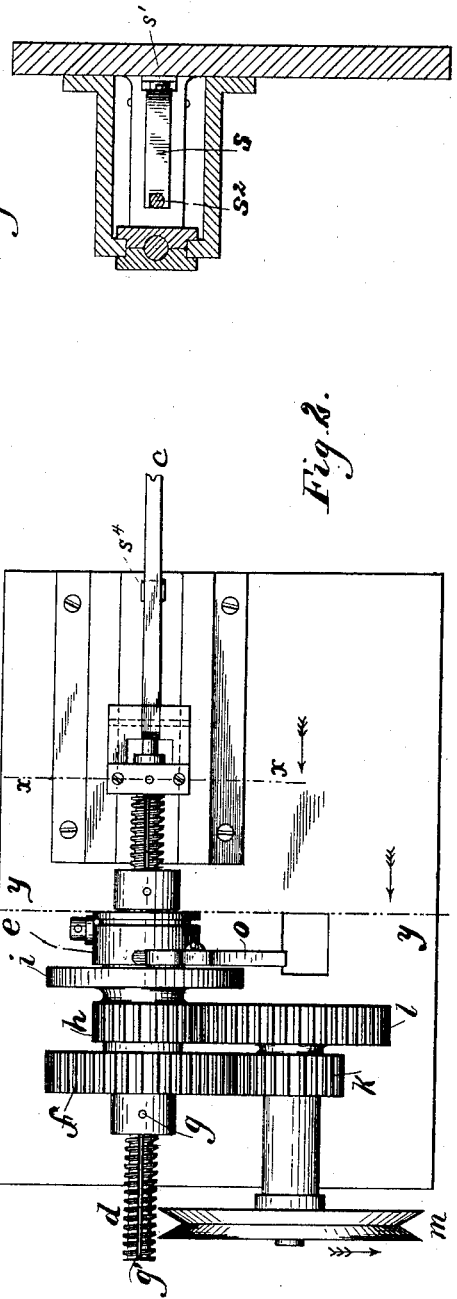
Witnesses.
Sam'l B. Dover.
F. H. McCulloch.
Inventor.
Charles E. Scribner
By George P. Barton
Attorney (No Model.) 3 Sheets—Sheet 2.
C. E. SCRIBNER.
REGULATOR FOR DYNAMO ELECTRIC MACHINES.
No. 435,525. Patented Sept. 2, 1890.
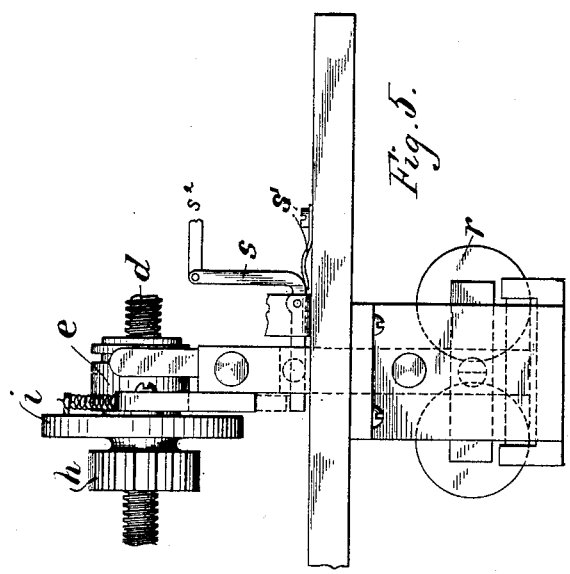
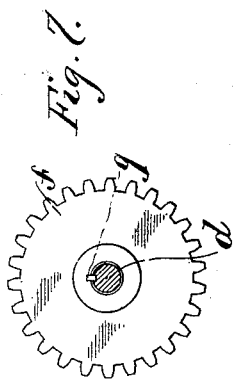
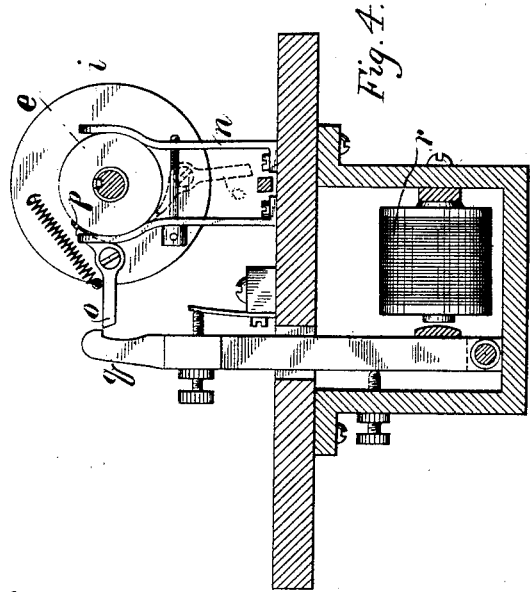
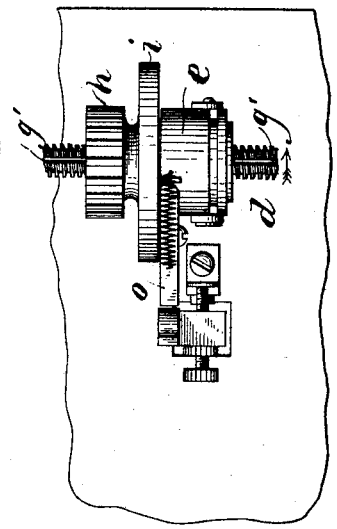
Witnesses.
Sam'l B. Dover.
T. H. McCulloch.
Inventor.
Charles E. Scribner
By George P. Barton
Attorney

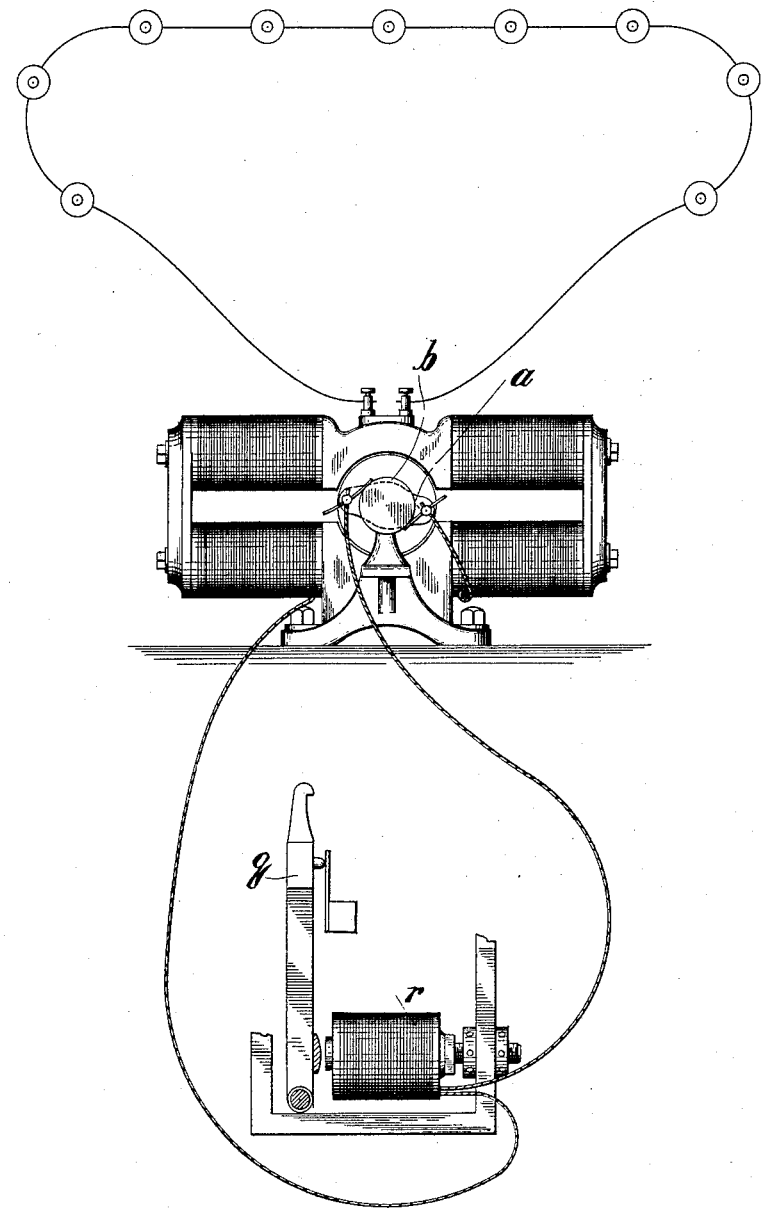

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

REGULATOR FOR DYNAMO-ELECTRIC MACHINES.

SPECIFICATION forming part of Letters Patent No. 435,525, dated September 2, 1890.

Application filed April 28, 1885. Serial No. 163,777. (No model.)

*To all whom it may concern:*

Be it known that I, CHARLES E. SCRIBNER, a citizen of the United States, residing at Chicago, in the county of Cook and State of Illinois, have invented a certain new and useful Improvement in Regulators for Dynamo-Electric Machines, (Case 91,) of which the following is a full, clear, concise, and exact description, reference being had to the accompanying drawings, forming a part of this specification.

My invention relates to regulators for dynamo-electric machines; and it consists in mechanism whereby the brushes are moved backward and forward automatically upon the commutator as the strength of the current varies, so as to maintain the current at approximately a given strength.

My invention also consists in a stop mechanism whereby the brushes are prevented from being carried back beyond the maximum point though the strength of current may fall below the minimum required.

The mechanism which I have invented may be applied to any dynamo-electric machine. The brushes are mounted on a quadrant or brush-carrier, which is adjustable about the shaft of the commutator, so that the brushes are moved with the quadrant back and forth.

Heretofore different devices have been used for moving the brush-carrier back and forth to adjust the brushes automatically, in order that the desired strength of current may be maintained. In nearly all of these previous automatic devices, and as far as I know in all of those which have been in actual use, the brush-carriers have been moved to regulate the strength of the current either by the direct force of the armature of a magnet in the main circuit or by means of a magnet in the local or derived circuit controlled by an electro-magnet placed in the main circuit. Where the force for regulating the brushes has been obtained directly from the electro-magnet in the main circuit, satisfactory results have not been obtained. On the other hand, where the relay has been used to make and break the local circuit containing the electro-magnet which does the work, very nice and frequent adjustments are required, the contact-points of the relay frequently becoming corroded or imperfect. In my regulator, as herein described, the power for doing the work is not dependent upon the strength of the current or of any electro-magnet, an electro-magnet merely serving by the change in position of its armature to control the operation of the regulator, which is driven continuously by any well-known mechanical means.

In my application, Serial No. 194,396, filed March 3, 1886, I have described an automatic regulator somewhat similar to the regular herein described, certain features of the invention as therein claimed being also shown in this application.

I will now describe my regulator as illustrated in the accompanying drawings, in which—

Figure 1 is a side elevation of my regulator. Fig. 2 is a plan view thereof. Fig. 3 is a sectional detail of the cross-head and guides upon line $x\, x$ of Fig. 2. Fig. 4 is a sectional view upon line $y\, y$ of Fig. 2. Fig. 5 is a detailed view of certain parts thereof. Fig. 6 is a top view of the nut, screw, and trigger shown in Fig. 4. Fig. 7 is a detailed view showing the feather moving in the longitudinal groove of the screw. Fig. 8 is a diagram illustrative of the circuits.

Like parts are indicated by similar letters of reference throughout the different figures.

The brush-carrier $a$ is adjustable about the commutator $b$. A movement of the brush-carrier forward in the direction indicated by the arrows adjusts the brushes to a point on the commutator where less current is obtained. On the other hand, when the brushes are moved backward, the strength of the current is increased. The rod $c$ connects the brush-carrier with the regulator, as shown, and thus serves to adjust the brush-carrier, and hence the brushes upon the machine, in response to the movements of the regulator.

The regulator consists of the constantly-revolving screw $d$, the nut $e$, tapped to fit the screw, the gear $f$, provided with the feather or spline $g$ in the longitudinal groove $g'$ of the screw, the gear $h$, rigidly attached to disk $i$, the driving-gears $k$ and $l$, meshing, respectively, with gear-wheels $f$ and $h$, and mechanism for operating the same, as will be hereinafter more fully described. The nut $e$ I term a "racing-nut," because when moving it travels faster than the screw. The pulley $m$ is mounted upon the same shaft with the driving-gears $k$ and $l$, and is driven continuously by means of a belt, or in any other suitable manner. The driving-gears $k$ $l$ are thus kept constantly turning. The driving-gears $k$ $l$ and their corresponding gear-wheels $f$ $h$ are preferably of such sizes that the gear-wheel $k$ will make two revolutions while the gear-wheel $f$ is making one revolution. Since the spline $g$ rests in the longitudinal groove $g'$ of the screw $d$, the said gear-wheel $f$ and said screw must turn together. The gear-wheel $h$ and the disk $i$ are free to move longitudinally and revolve upon the screw. The nut $e$, as before described, is provided with a thread corresponding to the thread of the screw, and it is by means of this nut that the screw is moved to the right and to the left from time to time to regulate the brushes. When the screw is turning in the direction indicated by the arrows within the nut and the nut is at rest, it is evident that the said screw will be carried to the right. On the other hand, if while the screw is revolving the nut is revolved in the same direction, but at a greater rate, it is evident that the screw will be moved to the left longitudinally.

I have provided means whereby the nut is automatically held at rest or driven faster than the screw, according to the strength of the current of the dynamo-machine, thus causing the brushes to move forward and backward upon the commutator, so as to keep the strength of the current approximately constant though the resistance of the circuit may vary. I have also provided a stop mechanism whereby the brushes are kept from being carried back of the position where the greatest strength of current is obtained. The friction-clamp $n$ tends to hold the nut at rest. The trigger $o$, pivoted upon the disk, is normally held by the coil-spring in the position shown by the full lines in Fig. 4, so that as it is carried by the movement of the disk it will engage with the lug $p$ upon the nut $e$, and thus carry the nut $e$ about the screw. As the disk revolves faster than the screw, the nut also will move faster than the screw, and thus the screw will be carried to the right as long as the trigger $o$ engages with the lug $p$. If, however, the trigger is tripped so as to pass over the lug, the nut will remain at rest and the screw, being kept in motion, will be carried to the left. The hook $g$, operated by means of the electro-magnet $r$ placed in the main circuit of the machine, is brought toward the trigger when the strength of the current through the said magnet is sufficient to move the armature which carries the hook. The trigger is thus tripped by the hook and disengaged from the lug $p$ whenever the strength of the electro-magnet is sufficient to bring the hook into the path of the outer arm of the trigger. When the trigger is thus disengaged from the lug of the nut, the nut remains at rest, held by the friction-clamp, while the trigger is carried around the nut, sliding on the outside thereof until it comes again to the lug $p$ and engages therewith, or is carried over the same, according to the strength of the current passing through the electro-magnet $r$. Thus a current above the maximum strength required causes the nut $e$ to remain at rest, while a decrease in the strength of the current causes the nut to be set in motion at a greater speed than that of the screw. The brush-carrier is thus moved so as to carry the brushes forward upon the commutator when the strength of the current is above the normal, and backward when below the normal. Thus when the current increases the brushes are adjusted forward so as to bring down the strength of the current, and when the strength of the current is weakened the brushes are immediately carried backward toward the position upon the commutator at which the greatest amount of current will be taken off. The strength of the current is thus automatically maintained within the desired limits. If, however, when the brushes are upon the maximum points of the commutator the current should not be strong enough to do the work required the tendency would be to carry the brushes still farther back and beyond the maximum point of the commutator. To avoid this I have provided a stop mechanism, which trips the trigger before the brushes are carried back of the position of maximum strength of current.

As shown in Figs. 1 and 5, the bell-crank $s$ is normally held in the position shown by means of the spring $s'$. The rod $s^2$ is pivoted to the upper end of the bell-crank and supported by the yoke $s^3$, carried by the cross-head. This yoke is carried back and forth with the cross-head as the cross-head is carried by the screw. The stop $s^4$ is provided upon the rod $s^2$. When the cross-head is moved to the right far enough so that the yoke $s^3$ comes against the stop $s^4$, it is evident that the bell-crank will be turned upon its pivot against the force of the spring $s'$. The lower arm of the bell-crank will thus be raised until the end of said arm comes into the path of the trigger. The trigger is indicated in dotted lines in Fig. 1, just above the arm of the bell-crank $s$. Now if this arm is raised slightly it is evident that it will come into the path of the trigger, and the trigger will thus be tripped so as to pass over the lug upon the nut. The nut will therefore remain at rest whenever the bell-crank is brought into the path of the trigger. If, therefore, the nut when in motion moves twice as fast as the screw and in the same direction it is evident that the trigger will be tripped by the lever $s$ at every other revolution, so as to maintain the cross-head approximately at a given point and prevent carrying the brushes back of the position of maximum current upon the commutator.

The stop $s^4$ may be adjusted at any desired point upon the rod $s^2$. It will thus be seen that this stop mechanism is brought into use the moment the yoke $s^3$ presses against the stop $s^4$.

In Fig. 8 the electro-magnet $r$ is shown included in the main circuit. The lamps are shown in the same circuit on the opposite side of the machine.

The electro-magnet $r$ may be adjusted toward or away from the armature by means of nuts upon the shaft or screw which supports the electro-magnet. The thread upon the screw $d$ may be coarse or fine, according to the delicacy of adjustment required. I preferably fit the screw somewhat loosely to the cross-head, so that there may be a little lost motion each time the movement of the screw is changed from one direction to the other, thus making the adjustment as fine as may be desired.

I do not limit myself to any particular form of screw or screw mechanism or triggers, or electro-magnetic devices in the circuit of the machine for controlling the movement of the screw, since it is evident that many different forms of these devices might be used without departing from my invention.

Certain features of my invention, it is evident, might be applied in various mechanical movements. For example, I believe it to be new to effect a reciprocating motion by screw mechanism consisting of a screw and its nut, both revolving in the same direction, the reciprocation being effected by the change of the relative speed between the nut and the screw; and I therefore do not limit myself to regulators of dynamo-electric machines, but claim my invention broadly, as hereinafter set forth in the claims.

Having thus described my invention, I claim as new and desire to secure by Letters Patent—

1. The combination, with the main circuit of a dynamo-electric machine, of an electro-magnet, the armature of said electro-magnet carrying a hook, the screw of the regulator provided with the longitudinal groove, and the spline or feather of the gear-wheel $f$ resting in said groove, the gear-wheel $h$, loose upon the screw and driven at a greater speed than the gear-wheel $f$, the nut $e$, provided with a thread which fits the screw, the trigger carried by the gear-wheel $h$ and held normally by a spring toward the nut, the lug upon the nut, the friction-clamp and cross-head and the pitman extending to the brush-carrier, said brush-carrier and brushes, whereby a change in the strength of current in the main circuit automatically produces a change in the position of the brushes, thus maintaining the current at approximately the desired strength.

2. The combination, with the commutator, of the brushes and brush-carrier of a dynamo-electric machine, of an automatic regulator for maintaining the strength of the current of the machine at approximately the same strength, the said regulator consisting of a screw and devices for connecting the same with the brush-carrier, driving-gear for keeping the screw continually turning, the racing-nut upon the screw, the friction-clamp for holding the nut when disengaged from the driving-gear, the electro-magnet in the main circuit of the machine, and the hook operated thereby, whereby the position of the hook is changed when the strength of the current is increased and the driving mechanism thrown out of engagement with the nut simply by the change in the position of the hook.

3. The combination, in a regulator for dynamo-electric machines, with the constantly-driven screw and racing-nut placed thereon, of mechanism for revolving the said racing-nut faster than the screw, and a stop mechanism for disengaging the said revolving mechanism from the nut at a certain point, whereby the longitudinal movement of the screw is limited, substantially as and for the purpose specified.

4. The combination, with the trigger $o$, carried by the revolving disk, of the racing-nut $e$, with which said trigger normally engages, and the hook $g$, operated by an electro-magnet in the main circuit of the dynamo-electric machine, whereby the said hook is brought into the path of said trigger when the strength of the current increases beyond the strength desired, thereby disengaging the trigger from the nut, substantially as shown and described.

5. The combination, with the continuously-driven screw, of the brushes and brush-carrier linked to said screw, the nut $e$, provided with a thread corresponding to the thread of the screw, and mechanism engaging with said nut and racing said nut over the screw, whereby the screw is driven longitudinally to adjust the brushes, substantially as and for the purpose specified.

6. The combination, with the continuously-driven screw, of the brushes and the brush-carrier linked to said screw, the nut placed upon the screw and provided with a thread corresponding thereto, mechanism engaging with said nut and racing the said nut over the screw, and an electro-magnetic device in the circuit of the dynamo-electric machine for disengaging the racing mechanism from the nut, whereby the brushes are automatically regulated to maintain the current at approximately the desired strength.

7. The combination, in a current-regulator for dynamo-electric machines, with racing-nut and trigger, of the stop mechanism consisting of the bell-crank $s$, the spring $s'$, and the link or rod $s^2$, supported in the yoke $s^3$ and provided with the stop $s^4$, whereby said trigger may be thrown out of engagement with the racing-nut when the yoke presses against the stop $s^4$, substantially as shown and described.

8. The screw $d$ and the racing-nut for driving the same longitudinally, mechanism linking said screw to the brush-carrier, an electro-magnet in the circuit of the machine, the hook operated thereby, and the stop mechanism, whereby the current is maintained at approximately the same strength until it falls below the minimum required, at which time the brushes are kept from passing back of the maximum point upon the commutator.

In witness whereof I hereunto subscribe my name this 22d day of April, A. D. 1885.

CHARLES E. SCRIBNER.

Witnesses:
GEORGE P. BARTON,
F. H. McCULLOCH.